(12) United States Patent
He (10) Patent No.: US 10,819,994 B2
(45) Date of Patent: Oct. 27, 2020

(54) IMAGE ENCODING AND DECODING METHODS AND DEVICES THEREOF

(71) Applicant: BEIJING CENTURY TECHNOLOGY CO., LTD., Beijing (CN)

(72) Inventor: Jianqiang He, Beijing (CN)

(73) Assignee: BEIJING CENTURY TECHNOLOGY., LTD, Beijing (CN)

( * ) Notice: Subject to any disclaimer, the term of this patent is extended or adjusted under 35 U.S.C. 154(b) by 226 days.

(21) Appl. No.: 15/609,790

(22) Filed: May 31, 2017

(65) Prior Publication Data

US 2018/0007375 A1 Jan. 4, 2018

(30) Foreign Application Priority Data

Jun. 30, 2016 (CN) .......................... 2016 1 0509934

(51) Int. Cl.
*H04N 19/40* (2014.01)
*H04N 19/136* (2014.01)
(Continued)

(52) U.S. Cl.
CPC ........... *H04N 19/40* (2014.11); *H04N 19/103* (2014.11); *H04N 19/136* (2014.11);
(Continued)

(58) Field of Classification Search
None
See application file for complete search history.

(56) References Cited

U.S. PATENT DOCUMENTS

| 9,648,333 B2 | 5/2017 | He et al. |
| 2005/0117036 A1* | 6/2005 | Nishi ................... H04N 19/117 348/241 |

(Continued)

FOREIGN PATENT DOCUMENTS

| CN | 101077013 A | 11/2007 |
| CN | 101695133 A | 4/2010 |

(Continued)

OTHER PUBLICATIONS

Taiwan Office Action dated Apr. 18, 2018 for Taiwan application No. 106116910.

(Continued)

*Primary Examiner* — Kaitlin A Retallick
(74) *Attorney, Agent, or Firm* — Ohlandt, Greeley, Ruggiero and Perle, LLP (57) ABSTRACT

Image encoding and decoding methods and devices thereof are provided. The encoding method includes: performing downsampling on a first image to obtain a second image; encoding the second image to obtain a second image bit stream, and sending the second image bit stream to a decoding end; processing the second image to obtain a third image having a resolution the same as that of the first image; calculating a difference between the third image and the first image to obtain a first difference image; regulating pixel values of the first difference image to fall within a pre-set range, to obtain a second difference image; and encoding the second difference image to obtain a second difference image bit stream, and sending the second difference image bit stream to the decoding end to enable the decoding end to reconstruct the first image.

8 Claims, 6 Drawing Sheets

(51) Int. Cl.
*H04N 19/103* (2014.01)
*H04N 19/186* (2014.01)
*H04N 19/59* (2014.01)
*H04N 19/154* (2014.01)
*H04N 19/426* (2014.01)
*H04N 19/436* (2014.01)
*H04N 19/60* (2014.01)

(52) U.S. Cl.
CPC ......... *H04N 19/154* (2014.11); *H04N 19/186* (2014.11); *H04N 19/426* (2014.11); *H04N 19/59* (2014.11); *H04N 19/436* (2014.11); *H04N 19/60* (2014.11)

(56) References Cited

U.S. PATENT DOCUMENTS

| | | | | |
|---|---|---|---|---|
| 2006/0146931 A1* | 7/2006 | Boyce | ................ | H04N 19/159 |
| | | | | 375/240.08 |
| 2006/0190247 A1* | 8/2006 | Lindblom | ............ | G10L 19/008 |
| | | | | 704/230 |
| 2009/0252425 A1* | 10/2009 | Bruls | ..................... | H04N 19/14 |
| | | | | 382/232 |
| 2010/0061447 A1* | 3/2010 | Tu | .......................... | H04N 19/51 |
| | | | | 375/240.03 |
| 2014/0003509 A1* | 1/2014 | Hong | .................... | H04N 19/11 |
| | | | | 375/240.12 |
| 2014/0037015 A1 | 2/2014 | Ye et al. | | |
| 2014/0086327 A1* | 3/2014 | Ugur | ..................... | H04N 19/52 |
| | | | | 375/240.16 |
| 2015/0103887 A1* | 4/2015 | Ramasubramonian | ..................... | |
| | | | | H04L 65/607 |
| | | | | 375/240.02 |

FOREIGN PATENT DOCUMENTS

| | | |
|---|---|---|
| JP | 2004200760 A | 7/2004 |
| TW | 201429260 A | 7/2014 |
| TW | 201531090 A | 8/2015 |

OTHER PUBLICATIONS

Chinese Office Action dated Sep. 4, 2018 for Chinese application No. 201610509934.7.

* cited by examiner

IMAGE ENCODING AND DECODING METHODS AND DEVICES THEREOF

CROSS-REFERENCE TO RELATED APPLICATIONS

The present application claims priority to Chinese Patent Application No. 201610509934.7, filed with the State Intellectual Property Office of People's Republic of China on Jun. 30, 2016 titled "IMAGE ENCODING AND DECODING METHODS AND DEVICES THEREOF", the content of which is incorporated herein by reference in its entirety.

TECHNICAL FIELD

The present disclosure relates the technical field of image processing, and in particular to image encoding and decoding methods and devices thereof.

BACKGROUND

The resolutions of video which are main media for carrying multimedia develop from standard definition to high definition and ultra high definition. At present, typical high-definition resolutions include 1280×720, 1980×1080 and so on, and typical ultra high-definition 4K includes 4096×2160, 3840×2160 and so on. Ultra high-definition 4K has been widely applied to various fields related to images or videos, and the definition of 8K is in the trial stage.

Wide spread and distribution of videos depends on the effective video encoding technology. Currently used video encoding standards include the second generation video encoding standard H.264 and the third generation video encoding standard H.265, and decoder chips of players of most terminals all support H.264 at present.

Multicore has become a mainstream for CPUs, parallel computing becomes one of the preferred solutions for many real-time applications due to the application of multicore. For video encoding, parallel encoding is an important technology for real-time encoding. For example, an open source H.264 encoder such as x264 usually adopts frame-level parallelism. In practice, since temporal correlation of a video may cause strong reference dependency between adjacent frames, which limits frame-level parallelism. Therefore, parallel performance is not ideal in the case that the resolution of a video is too high or too low. By comparing encoding speeds and CPU utilization ratios of encoding videos having different resolutions with a multicore CPU (based on x264) such as Intel-i7, it is found that: for 4K encoding, the factors, such as frame-level dependency, a very large sub-pixel reference frame cache, a large amount of IO reading and writing, result in that the CPU utilization ratio and the encoding speed are low, which does not satisfy the requirement on real-time performance; and for 1080p (a display format for video), real-time encoding can be achieved easily, and multiple channels of 1080p may be process-level parallel and can be encoded in a real-time manner in a case that enough cores are used, but real-time encoding and transcoding of 4K can not be achieved by simply increasing the number of cores. For the above problem, a conventional solution includes: dividing an original high-resolution video into multiple low-resolution videos, encoding the low-resolution videos respectively, and splicing the divided videos on a decoding end to obtain a video having a target resolution.

Parallel encoding capacity can be improved by the above solution, but an obvious boundary effect for image partition boundaries may be generated. Since each of the divided videos are encoded separately, if frame types, encoding quantization parameters, code rates, reference lists and reference frames of the divided videos differ greatly at a same instant, the discontinuity effect for the partition boundaries may be more obvious, which greatly reduce the quality of the video.

SUMMARY

In view of the above, image encoding and decoding methods and devices thereof are provided according to the present disclosure, to solve the problem that the encoding method in the conventional technology may cause an obvious boundary effect and low quality videos. The technical solutions are provided hereinafter.

An image encoding method applied to an encoding end is provided, and the method includes:

performing downsampling on a first image based on a pre-set sampling ratio and a pre-set sampling method to obtain a second image, where the first image is a high-resolution image or a high-resolution video frame, or the first image is a low-resolution image or a low-resolution video frame obtained by performing downsampling on the high-resolution image or the high-resolution video frame for at least one time;

encoding the second image to obtain a second image bit stream, and sending the second image bit stream to a decoding end;

processing the second image based on a pre-set processing rule to obtain a third image having a resolution the same as that of the first image;

calculating a difference between the third image and the first image to obtain a first difference image;

regulating, based on a pre-set offset value, pixel values of the first difference image to fall within a pre-set range, to obtain a second difference image; and encoding the second difference image in a pre-set encoding manner to obtain a second difference image bit stream, and sending the second difference image bit stream to the decoding end to enable the decoding end to reconstruct, based on the second image bit stream and the second difference image bit stream, the first image.

Optionally, the processing the second image based on a pre-set processing rule to obtain a third image having a resolution the same as that of the first image includes:

performing upsampling on the second image based on the pre-set sampling ratio and a pre-set sampling method to obtain the third image having the resolution the same as that of the first image;

or, reconstructing the second image to obtain a second reconstruction image; and performing upsampling on the second reconstruction image based on the pre-set sampling ratio and a pre-set sampling method to obtain the third image having the resolution the same as that of the first image.

Optionally, the encoding the second difference image in a pre-set encoding manner to obtain a second difference image bit stream includes:

performing full-image encoding on the second difference image to obtain one difference image bit stream;

or, dividing the second difference image into multiple blocks to obtain multiple difference image blocks; and encoding the multiple difference image blocks respectively to obtain multiple difference image bit streams.

Optionally, the method further includes:

storing an encoding parameter of second image when encoding the second image; and the encoding the second difference image in a pre-set encoding manner includes:

determining an encoding parameter of the second difference image based on the encoding parameter of the second image, and encoding the second difference image based on the encoding parameter of the second difference image.

Optionally, the encoding the second difference image in a pre-set encoding manner includes: in a case that a value of a channel component of the second difference image is less than a set threshold, encoding the other channel components.

An image decoding method applied to a decoding end is provided, and the method includes:

receiving a second image bit stream and a second difference image bit stream;

decoding the second image bit stream and the second difference image bit stream to obtain a second image and a second difference image;

performing upsampling on the second image based on a pre-set sampling ratio and a pre-set sampling method to obtain a third image;

regulating pixel values of the second difference image based on a pre-set offset value to obtain a first difference image; and calculating a sum of the first difference image and the third image to obtain a first image.

Optionally, the decoding the second difference image bit stream to obtain a second difference image includes:

decoding the second difference image bit stream in a case that the second difference image bit stream includes multiple difference image bit streams, to obtain multiple difference image blocks; and splicing the multiple difference image blocks to obtain the second difference image.

Specifically, the second image bit stream and the second difference image bit stream carry bit stream property information indicating whether a bit stream received is the second image bit stream or the difference image bit stream, and index information of a block corresponding to the bit stream received; and the decoding the second image bit stream and the second difference image bit stream to obtain a second image and a second difference image specifically includes:

decoding the second image bit stream and the second difference image bit stream based on the bit stream property information and the index information of the block corresponding to the bit stream.

An image encoding device is provided, and the device includes: a downsampling module, a first encoding module, a processing module, a first calculation module, a first regulation module and a second encoding module;

where the downsampling module is configured to perform downsampling on a first image based on a pre-set sampling ratio and a pre-set sampling method to obtain a second image, and the first image is a high-resolution image or a high-resolution video frame, or the first image is a low-resolution image or a low-resolution video frame obtained by performing downsampling on the high-resolution image or the high-resolution video frame for at least one time;

the first encoding module is configured to encode the second image to obtain a second image bit stream, and send the second image bit stream to a decoding end;

the processing module is configured to process the second image based on a pre-set processing rule to obtain a third image having a resolution the same as that of the first image;

the first calculation module is configured to calculate a difference between the third image and the first image to obtain a first difference image;

the first regulation module is configured to regulate, based on a pre-set offset value, pixel values of the first difference image to fall within a pre-set range, to obtain a second difference image; and the second encoding module is configured to encode the second difference image in a pre-set encoding manner to obtain a second difference image bit stream, and send the second difference image bit stream to the decoding end to enable the decoding end to reconstruct the first image, based on the second image bit stream and the second difference image bit stream.

Optionally, the processing module includes a first upsampling submodule, or includes a reconstruction submodule and a second upsampling submodule;

the first upsampling submodule is configured to perform upsampling on the second image based on the pre-set sampling ratio and a pre-set sampling method to obtain the third image having the resolution the same as that of the first image;

the reconstruction submodule is configured to reconstruct the second image to obtain a second reconstruction image; and the second upsampling submodule is configured to perform upsampling on the second reconstruction image based on the pre-set sampling ratio and a pre-set sampling method to obtain the third image having the resolution the same as that of the first image.

Optionally, the second encoding module includes a first encoding submodule, or includes a division submodule and a second encoding submodule;

the first encoding submodule is configured to perform full-image encoding on the second difference image to obtain one difference image bit stream;

the division submodule is configured to divide the second difference image into multiple blocks to obtain multiple difference image blocks; and the second encoding submodule is configured to encode the multiple difference image blocks respectively to obtain multiple difference image bit streams.

Optionally, the device further includes a storage module, where the storage module is configured to store an encoding parameter of second image when the first encoding module encodes the second image; and the second encoding module is configured to determine an encoding parameter of the second difference image based on the encoding parameter of the second image, and encode the second difference image based on the encoding parameter of the second difference image.

Optionally, the second encoding module is configured to: in a case that a value of a channel component of the second difference image is less than a set threshold, encode other channel component.

An image decoding device is provided, and the device includes: a receiving module, a decoding module, an upsampling module, a second regulation module and a second calculation module:

where the receiving module is configured to receive a second image bit stream and a second difference image bit stream;

the decoding module is configured to decode the second image bit stream and the second difference image bit stream to obtain a second image and a second difference image;

the upsampling module is configured to perform upsampling on the second image based on a pre-set sampling ratio and a pre-set sampling method to obtain a third image;

the second regulation module is configured to regulate pixel values of the second difference image based on a pre-set offset value to obtain a first difference image; and the second calculation module is configured to calculate a sum of the first difference image and the third image to obtain a first image.

Optionally, the decoding module includes: a decoding submodule and a splicing submodule:

the decoding submodule is configured to decode the second difference image bit stream in a case that the second difference image bit stream includes multiple difference image bit streams, to obtain multiple difference image blocks; and the splicing submodule is configured to stitch the multiple difference image blocks to obtain the second difference image.

Optionally, the second image bit stream and the second difference image bit stream carry bit stream property information indicating whether a bit stream received is the second image bit stream or the difference image bit stream, and index information of a block corresponding to the bit stream received; and the decoding module is configured to decode the second image bit stream and the second difference image bit stream based on the bit stream property information and the index information of the block corresponding to the bit stream.

The above technical solutions have the following benefits.

According to the encoding and decoding methods and the devices thereof provided in the present disclosure, downsampling is performed on a first image (an image or a video which is to be encoded) based on a pre-set sampling ratio and a pre-set sampling method to obtain a second image; the second image is encoded to obtain a second image bit stream; the second image is processed based on a pre-set processing rule to obtain a third image having a resolution the same as that of the first image; a difference between the third image and the first image is calculated to obtain a first difference image; the first difference image is regulated based on a pre-set offset value to obtain a second difference image, so as to ensure that pixel values of the first difference image are positive; the second difference image is encoded to obtain a second difference image bit stream, the second image bit stream and the second difference image bit stream are sent to a decoding end; the decoding end performs decoding and reconstruct the first image based on the second image bit stream and the second difference image bit stream. according to the encoding and decoding methods provided in the embodiments of the present disclosure, upsampling and downsampling to an image will not bring an obvious boundary effect and may only result in the image being a little blurred; and since most pixel values of a difference image are very small, details lost due to upsampling and downsampling can be provided by adding the pixel values to the upsampled image without causing an obvious partition boundary effect, generating a high quality image/video. In addition, multilevel low resolution downward compatibility can be achieved based on the present disclosure, which reduces storage and transmission bandwidth for applications such as Internet website that are required to provide bit streams for terminals having various resolutions and reduces repeated encoding and decoding calculation of low-resolution images/videos.

BRIEF DESCRIPTION OF THE DRAWINGS

In order to illustrate technical solutions in embodiments of the present disclosure or in the conventional technology more clearly, drawings used in the description of the embodiments or the conventional technology are introduced briefly hereinafter. Apparently, the drawings described hereinafter merely illustrate some embodiments of the present disclosure, and other drawings may be obtained by those skilled in the art based on these drawings without any creative efforts.

DETAILED DESCRIPTION OF THE EMBODIMENTS

The technical solutions in the embodiments of the present disclosure are clearly and completely described hereinafter in conjunction with the drawings in the embodiments of the present disclosure. Apparently, the described embodiments are only a few rather than all of the embodiments of the present disclosure. All other embodiments obtained by those skilled in the art based on the embodiments of the present disclosure without any creative efforts fall within the protection scope of the present disclosure.

Figure 1:
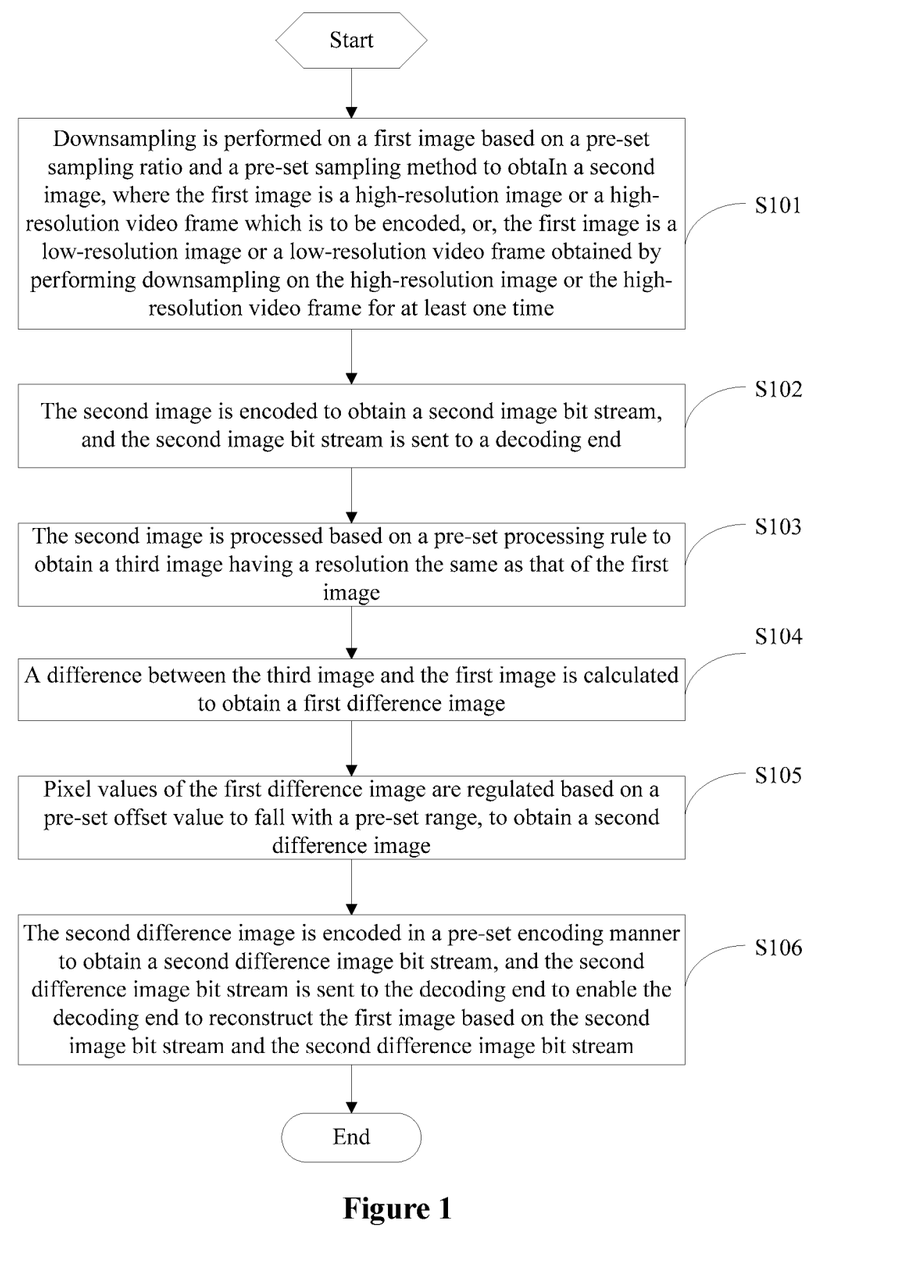
FIG. 1 is a schematic flow chart of an image encoding method according to an embodiment of the present disclosure.

An image encoding method applied to an encoding end is provided according to an embodiment of the present disclosure. Reference is made to FIG. 1, which is a schematic flow chart of the image encoding method. The method may include steps S101 to S106.

In step S101, downsampling is performed on a first image based on a pre-set sampling ratio and a pre-set sampling method to obtain a second image.

The first image is a high-resolution image or a high-resolution video frame which is to be encoded, or, the first image is a low-resolution image or a low-resolution video frame obtained by performing downsampling on a high-resolution image or a high-resolution video frame for at least one time.

A high-resolution video frame is taken as an example. The image encoding method according to the embodiment of the present disclosure may be applied to the high-resolution video frame, and may also be applied to a first-level low-resolution video frame obtained by performing downsampling on the high-resolution video frame and a second-level low-resolution video frame obtained by performing downsampling on the first-level low-resolution video frame, and so forth. That is, multilevel encoding and decoding of an image or a video may be achieved based on the embodiment of the present disclosure.

In step S102, the second image is encoded to obtain a second image bit stream, and the second image bit stream is sent to a decoding end.

In step S103, the second image is processed based on a pre-set processing rule to obtain a third image having a resolution the same as that of the first image.

The processing the second image based on the pre-set processing rule to obtain the third image having the resolution the same as that of the first image may be implemented in various manners.

In a first possible implementation, the second image is reconstructed to obtain a second reconstruction image, and upsampling is performed on the second reconstruction image based on the pre-set sampling ratio and a pre-set sampling method to obtain the third image having the resolution the same as that of the first image.

In another possible implementation, upsampling is performed on the second image based on a pre-set sampling ratio and a pre-set sampling method to obtain the third image having the resolution the same as that of the first image.

In step S104, a difference between the third image and the first image is calculated to obtain a first difference image.

In step S105, pixel values of the first difference image are regulated to fall within a pre-set range based on a pre-set offset value, to obtain a second difference image.

In step S106, the second difference image is encoded in a pre-set encoding manner to obtain a second difference image bit stream, and the second difference image bit stream is sent to the decoding end, to enable the decoding end to reconstruct the first image based on the second image bit stream and the second difference image bit stream.

Figure 2:
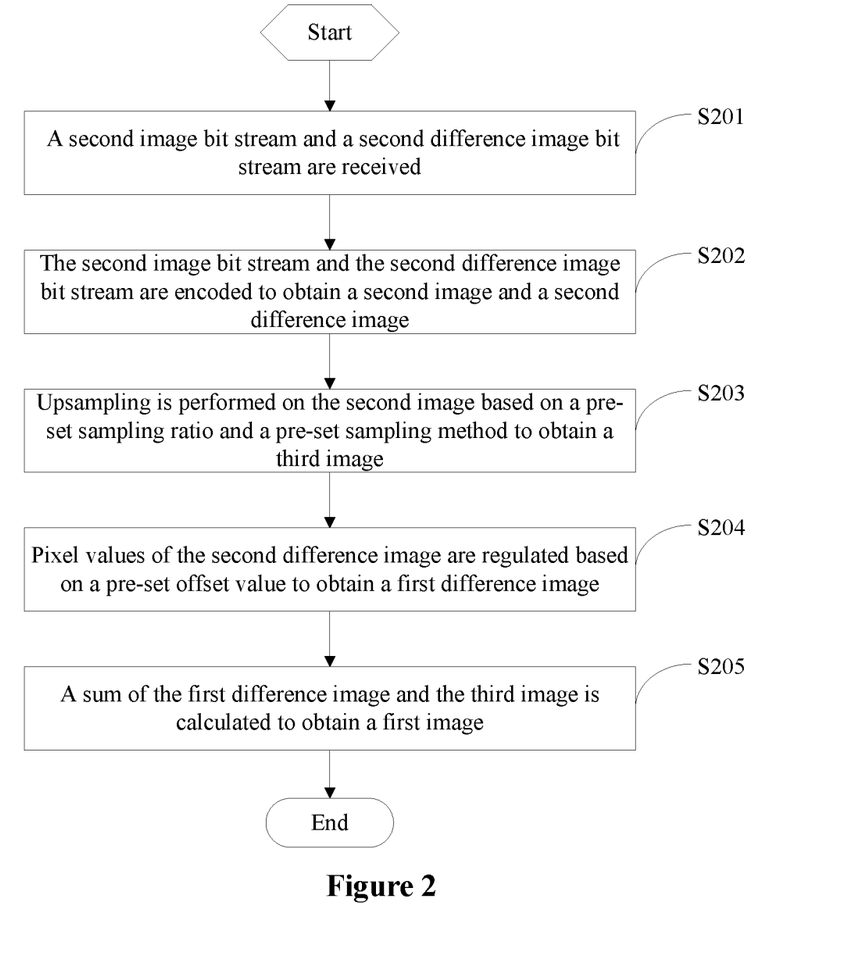
FIG. 2 is a schematic flow chart of an image decoding method according to an embodiment of the present disclosure.

After encoding, the encoding end sends the second image bit stream and the second difference image bit stream to the corresponding decoding end for decoding. Reference is made to FIG. 2, which is a schematic flow chart of an image decoding method corresponding to the image encoding method described above. The method may include steps S201 to S205.

In step S201, the second image bit stream and the second difference image bit stream are received.

In step S202, the second image bit stream and the second difference image bit stream are encoded to obtain the second image and the second difference image.

In step S203, upsampling is performed on the second image based on a pre-set sampling ratio and a pre-set sampling method to obtain the third image.

In step S204, pixel values of the second difference image are regulated based on a pre-set offset value to obtain the first difference image.

In step S205, a sum of the first difference image and the third image is calculated to obtain the first image.

The first image is an original high-resolution image that is restored, or a low-resolution image obtained by performing downsampling on the original high-resolution image for at least one time.

In the encoding and decoding methods according to the embodiments of the present disclosure, downsampling is performed on a first image (an image or a video frame which is to be encoded) based on a pre-set sampling ratio and a pre-set sampling method to obtain a second image; the second image is encoded to obtain a second image bit stream; the second image is processed based on a pre-set processing rule to obtain a third image having a resolution the same as that of the first image; a difference between the third image and the first image is calculated to obtain a first difference image; the first difference image is regulated based on a pre-set offset value to obtain a second difference image, so as to ensure that pixel values of the first difference image are positive; the second difference image is encoded to obtain a second difference image bit stream, the second image bit stream and the second difference image bit stream are sent to a decoding end; the decoding end performs decoding and reconstruct the first image based on the second image bit stream and the second difference image bit stream. According to the encoding and decoding methods provided in the embodiments of the present disclosure, upsampling and downsampling to an image will not bring an obvious boundary effect and may only result in the image being a little blurred; and since most pixel values of a difference image are very small, details lost due to upsampling and downsampling can be provided by adding the pixel values to the upsampled image without causing an obvious partition boundary effect, generating a high quality image/video. In addition, multilevel low resolution downward compatibility can be achieved based on the embodiments of the present disclosure, which reduces storage and transmission bandwidth for applications such as Internet website that are required to provide bit streams for terminals having various resolutions and reduces repeated encoding and decoding calculation of low-resolution images/videos.

Figure 3:
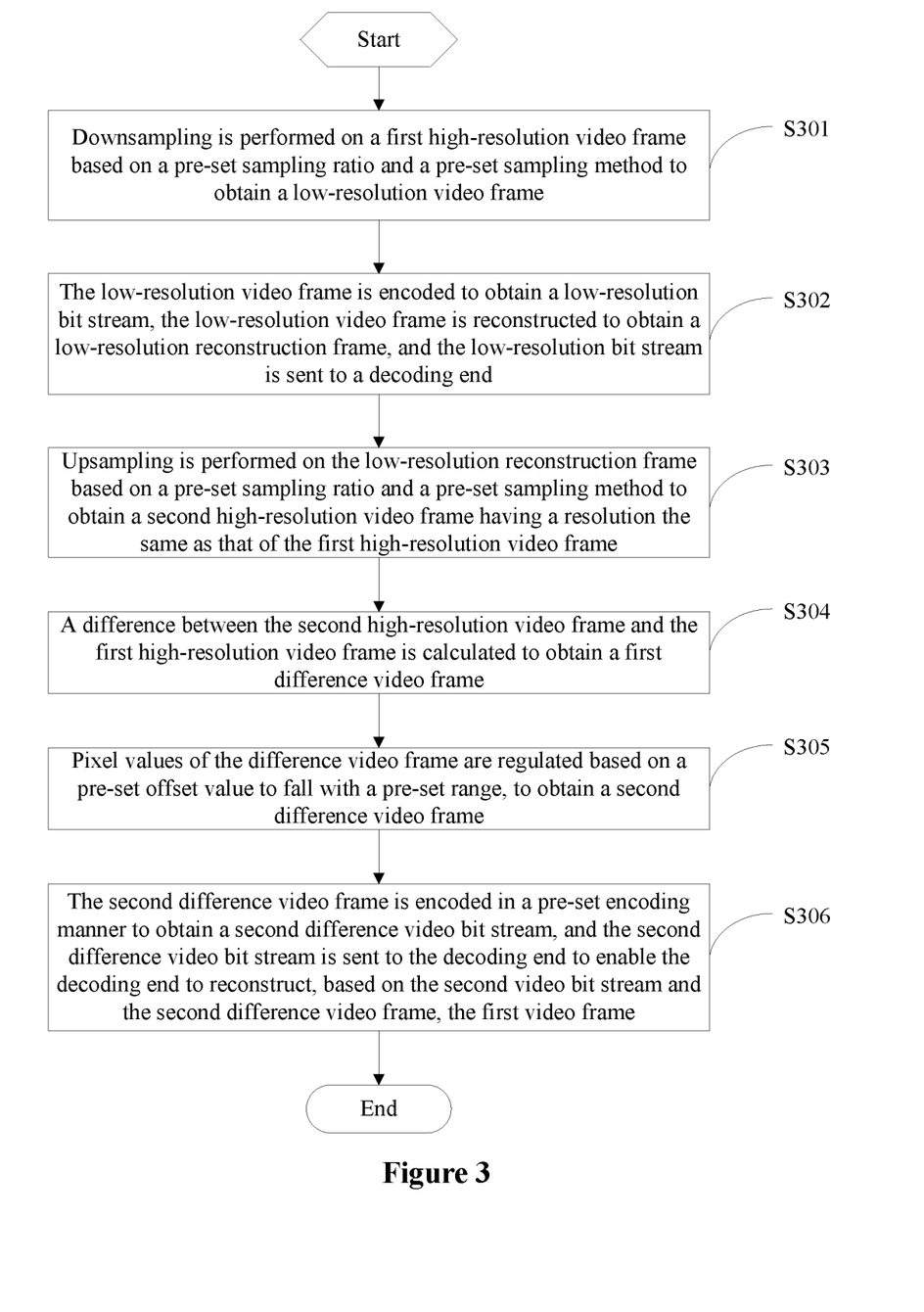
FIG. 3 is a schematic flow chart of an implementation of an example of an image encoding method according to an embodiment of the present disclosure.

An example in which a first image is a high-resolution video frame in a target video is provided for illustrating a specific implementation of an image encoding method according to an embodiment of the present disclosure. Reference is made to FIG. 3, which is a schematic flow chart of the image encoding method. The method may include steps S301 to S306.

In step S301, downsampling is performed on a first high-resolution video frame based on a pre-set sampling ratio and a pre-set sampling method to obtain a low-resolution video frame and a resolution of the low-resolution video frame.

The first high-resolution video frame is an original high-resolution video frame. It is assumed that a resolution of the first high-resolution video frame is W×H and the pre-set sampling interval is p×q, the low-resolution video frame having the resolution of (W/p)×(H/q) may be obtained.

In the embodiment, the performing downsampling on the first high-resolution video frame may be implemented in various manners. In a possible implementation, downsampling may be performed on the first high-resolution video frame based on a method of Nearest Neighbour Resampling. In another possible implementation, downsampling may be performed on the first high-resolution video frame based on a method of Bilinear Resampling.

In step S302, the low-resolution video frame is encoded to obtain a low-resolution bit stream, the low-resolution video frame is reconstructed to obtain a low-resolution reconstruction frame, and the low-resolution bit stream is sent to a decoding end.

In a possible implementation, H.264 encoding may be performed on the low-resolution video frame.

Optionally, in the process of encoding the low-resolution video frame, an encoding parameter such as a frame type, a reference frame list of each block, a reference frame of each block and a motion vector of each block, may be stored. For example, lowres_stat={pic_type, reflist, refidx, mv} is stored, and those parameters may be used in the next encoding of a difference video frame to improve the speed of encoding.

Besides, according to another possible implementation, in the process of sending the low-resolution bit stream to the decoding end, bit stream auxiliary information may be added to the low-resolution bit stream. The bit stream auxiliary information includes indication information for indicating the sampling method for performing downsampling on the original high-resolution video frame. On receiving the low-resolution bit stream, the decoding end may obtain the downsampling method from the bit stream auxiliary information to select the downsampling method for processing the video frame.

In step S303, upsampling is performed on the low-resolution reconstruction frame based on a pre-set sampling ratio and a pre-set sampling method to obtain a second high-resolution video frame having a resolution the same as that of the first high-resolution video frame.

In the embodiment, upsampling is performed on the low-resolution reconstruction frame based on the sampling ratio p×q which is the same as that used in the above downsampling, to obtain the second high-resolution video frame having the resolution the same as that of the first high-resolution video frame.

It should be noted that, in the embodiment, the low-resolution video frame is reconstructed to obtain the low-resolution reconstruction frame; and upsampling is performed on the low-resolution reconstruction frame to obtain the second high-resolution video frame having the resolution the same as that of the first high-resolution video frame, in which process a delay of one frame may be caused. Directly performing upsampling may avoids the delay, i.e., upsampling is performed on the low-resolution video frame directly to obtain the second high-resolution video frame having the resolution the same as that of the first high-resolution video frame. The above two methods have different advantages respectively. In the first method, it is generated a high quality video frame but the processing speed is slightly lower. In the second method, there is a high processing speed but the quality of the video frame is somewhat reduced. In practical applications, the method may be selected based on actual needs.

In step S304, a difference between the second high-resolution video frame and the first high-resolution video frame is calculated to obtain a first difference video frame.

In step S305, pixel values of the difference video frame are regulated to fall within a pre-set range based on a pre-set offset value, to obtain a second difference video frame.

The second difference video frame has a resolution the same as that of the first high-resolution video frame.

It should be noted that, in the first difference video frame obtained by calculating the difference between the second high-resolution video frame and the first high-resolution video frame, there are both positive pixel values and negative pixel values. In order to ensure that pixel values of the first difference video frame are positive, the offset value is set in advance. Two-step processing is performed on the pixel values of the difference video frame based on the set offset value. In the first step, the pixel values of the first difference video frame are limited to the interval of [−offset, +offset]. Then, the offset value is added to pixel values obtained after limiting. After the above processing on pixels of the first difference video frame, a new difference video frame is obtained, i.e., the second difference video frame described above. Pixel values of the second difference video frame all fall within the interval of [0, 2*offset]. In general, 0<offset<128. Preferably, offset is set as a value ranging from 16 to 64.

For example, the pixel values of the second high-resolution video frame are 100 and 120, and the corresponding pixel values of the first high-resolution video frame are 120 and 110. By calculating the difference between the second high-resolution video frame and the first high-resolution video frame, difference values −20 and 10 are obtained. It is assumed that the offset value is set as 16, then the difference values −20 and 10 are regulated to fall within the range of [−16, 16]. As a result, difference values −16 and 10 are obtained. The pixel values are preferably positive values, offset (i.e., 16) is added to the difference values −16 and 10, and the new difference values 0 and 26 are obtained. In this way, pixel values of the second difference image fall within the interval of [0, 32].

In step S306, the second difference video frame is encoded in a pre-set encoding manner to obtain a second difference video bit stream, and the second difference video bit stream is sent to the decoding end to enable the decoding end to reconstruct the first video frame based on the second video bit stream and the second difference video frame.

The encoding the second difference video frame may be implemented in various manners. In a possible implementation, full-frame encoding may be performed on the second difference video frame to obtain one difference video bit stream. In another possible implementation, the second difference image may be divided into m×n blocks to obtain m×n difference image blocks. The m×n difference image blocks are encoded respectively to obtain m×n difference video bit streams. Since the second encoding manner has a higher encoding performance, the second difference video frame may be preferably encoded in the second encoding manner.

In a case that encoding is performed based on the second encoding manner described above, there are tow implementations. In the first possible implementation, each block is encoded as a whole. In another possible implementation, each block is divided into multiple sub-blocks, and each sub-block in the each block is encoded. In practical applications, an implementation having a higher encoding performance may be selected by comparing the two implementations. In the embodiment, since pixel values of the second difference video frame and fluctuation values are small, the first implementation (i.e., encoding each block as a whole) is selected.

It should be noted that, a second difference video frame may be obtained for each first high-resolution video frame in the target video frame; and in the process of encoding, parallel encoding may be performed on all second difference video frames to improve an encoding speed.

Optionally, in a possible implementation, after the second difference video frame is obtained, filtering processing may be performed on the second difference video frame to reduce the bit rate, and a difference video frame obtained after filtering processing is encoded in the encoding manners described above. Optionally, in another possible implementation, after the second difference video frame is obtained, lossless compression may be performed on the second difference frame since a data volume thereof is generally small. There are various manners for lossless compression, such as zip and rar. Then the difference video frame on which lossless compression is performed is encoded in the encoding manner described above.

Moreover, in order to improve the encoding speed, in the process of encoding each block, the frame type, reference frame selection and initial motion search point which correspond to the each block may be determined based on the encoding parameter stored in the above step. In this case, encoding of the second difference video frame is delayed for one frame with respect to encoding of a low-resolution video image, and the delay is allowed in most real-time applications.

In addition, a value of a channel component of the second difference video frame is generally small. If the value of at least one channel component is less than a set threshold, other channel components are encoded to further reduce the bit rate and the complexity of encoding and transcoding. For example, if the second difference video frame is of YUV format, and the values of chrominance components U and V of the second difference video frame are zero, only one channel component, luminance Y, is encoded, to further reduce the bit rate and the complexity of encoding and transcoding.

It can be seen from the above steps that, one low-resolution video bit stream and m×n difference video bit streams (or one difference video bit stream) may be obtained through encoding. The low-resolution video bit stream and the difference video bit streams may be sent to the decoding end in form of video stream packet, and the video stream packet may include but not limited to NAL packet or PES packet.

In order to ensure that the decoding end successfully decodes the received low-resolution video bit stream and the difference video bit stream, in a possible implementation, a video stream packet sent to the decoding end may carry bit stream auxiliary information including indication information indicating a bit stream property (for example, indicating whether a bit stream is a low-resolution video bit stream or a difference video bit stream) and index information of a block corresponding to the bit stream (for example, the second difference video is divided into m×n blocks, and the bit stream corresponds to the i-th block).

In another possible implementation, a bit stream property and index information of a block corresponding to a bit stream may be indicated by the name of a video stream packet. For example, the suffix of _lowres is added to a name of the video stream packet to indicate that the bit stream is a low-resolution bit stream; and the suffix of m×n_i is added to the name of the video stream packet to indicate that, the bit stream is a difference video bit stream, the second difference video frame is divided into m×n blocks, and the bit stream corresponds to the i-th block.

In still another possible implementation, the encoding end and the decoding end may appoint a division method and a transmission order in advance. For example, it is appointed that the second difference video frame is to be divided into 2×2 blocks equally, and bit steams of the blocks are sent in sequence. It should be noted that, if a equal division method is appointed in advance, but the method is not performed on the process of block dividing, the resolution and the location of each block may be indicated in bit stream auxiliary information or Meta information of a bit stream. If the method is performed on the process of block dividing, only location information is indicated. For example, if an equal division of it is appointed of 2×2 is appointed in advance, but an unequal division or an equal division of 4×4 is performed on the process of block dividing. The resolution and the location of each block is indicated in bit stream auxiliary information or Meta information of a bit stream in a case that the unequal division is performed; The location of each block is indicated in bit stream auxiliary information or Meta information of a bit stream in a case that the equal division of 4×4 is performed. These pieces of information and the blocks of the difference video frame are processed and synthesized by a player or a renderer without the need for modifying an encoder or a decoder.

Figure 4:
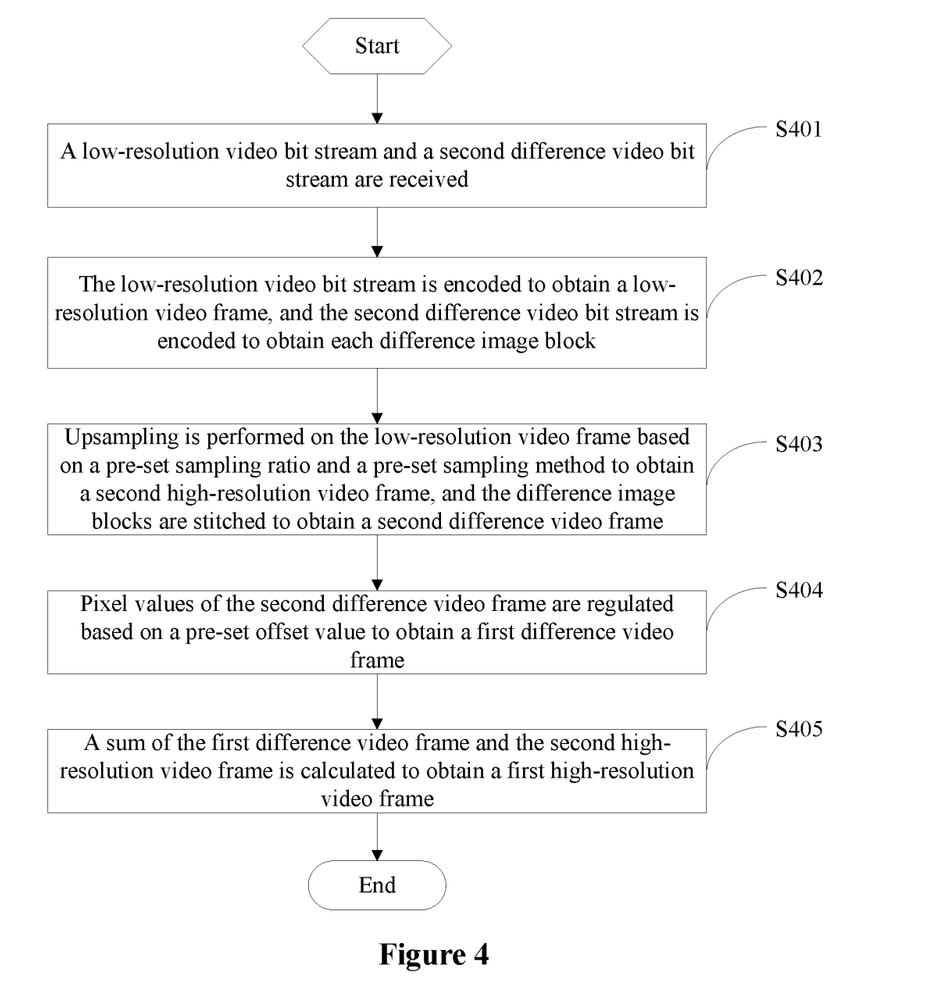
FIG. 4 is a schematic flow chart of an image decoding method according to an embodiment of the present disclosure, which corresponds to the image encoding method shown in FIG. 3.

The low-resolution video bit stream and the second difference video bit stream obtained by the encoding end are sent to the decoding end for decoding. Reference is made to FIG. 4, which shows a video decoding method corresponding to the video encoding method according to the above embodiment is provided. The method may include steps S401 to S405.

In step S401, the low-resolution video bit stream and the second difference video bit stream are received.

In step S402, the low-resolution video bit stream is encoded to obtain a low-resolution video frame, and the second difference video bit stream, is encoded to obtain difference image blocks.

In step S403, upsampling is performed on the low-resolution video frame based on a pre-set sampling ratio and a pre-set sampling method to obtain a second high-resolution video frame, and the difference image blocks are spliced to obtain the second difference video frame.

It should be noted that, it is assumed in the embodiment that, an encoding method for the second difference video frame, which is used by an encoding end, is encoding each block respectively. Each difference image block is obtained by decoding the second difference video bit stream. The difference image blocks are spliced to restore the second difference video frame. If an encoding method for the second difference video frame, which is used by the encoding end, is full-frame encoding, the second difference video frame is obtained by decoding the second difference video bit stream.

Optionally, in order to reduce the boundary effect of splicing the difference image blocks, a processing such as smoothing filtering may be performed on splicing boundaries of the difference image.

In step S404, pixel values of the second difference video frame are regulated based on a pre-set offset value to obtain a first difference video frame.

Specifically, the offset value is subtracted from each pixel value of the second difference video frame, to obtain the first difference video frame.

In step S405, a sum of the first difference video frame and the second high-resolution video frame is calculated to obtain the first high-resolution video frame.

Upon obtaining the first difference video frame, the first high-resolution video frame, i.e., the original high-resolution video frame, is reconstructed by adding the first difference video to the second high-resolution video frame.

It should be noted that, if a terminal device can only play videos having low resolutions due to decoding capacity and bandwidth, it may obtain and decode a low-resolution bit stream directly.

It should be noted that, the exampled encoding and decoding methods described above are for an original high-resolution video frame. Downsampling may be performed on the original high-resolution video frame for one time. In addition, multiple levels of downsampling may be performed on the high-resolution video frame, and a difference video frame is extracted for each level respectively. Hence, multilevel low resolution downward compatibility can be achieved, which can reduce storage and transmission bandwidth for applications such as Internet video website that are required to provide bit streams for terminals having various resolutions. For example, for a video frame of 3840×2160, a low-resolution video frame of 1920×1080 and a corresponding difference video frame may be obtained by performing downsampling. For the low-resolution video frame of 1920×1080, a second-level low-resolution video frame of 960×540 and a corresponding second-level difference video frame may be obtained by further performing downsampling. For the second-level low-resolution video frame of 960×540, a third-level low-resolution video frame of 480×270 and a corresponding third-level difference video frame may be obtained by further performing downsampling, and so forth. Encoding and decoding methods for each level are similar, and reference can be made to the above embodiments for specific processes, which are not described herein.

In the encoding and decoding methods according to the embodiments of the present disclosure, downsampling is performed on a first high-resolution video frame, i.e., an original high-resolution video frame, based on a pre-set sampling ratio to obtain a low-resolution video frame; the low-resolution video frame is encoded to obtain a low-resolution video bit stream; the low-resolution video frame is processed based on a pre-set processing rule to obtain a second high-resolution video frame having a resolution the same as that of the first high-resolution video frame; a difference between the second high-resolution video frame and the first high-resolution video frame is calculated to obtain a first difference video frame; the first difference video frame is regulated based on a pre-set offset value to obtain a second difference video frame, so as to ensure that pixel values of the first difference video frame are positive; the second difference video frame is encoded to obtain a second difference video bit stream, the low-resolution video bit stream and the second difference video bit stream are sent to a decoding end; the decoding end performs decoding and reconstruct the original high-resolution video frame based on the second video bit stream and the second difference video bit stream. According to the encoding and decoding methods provided in the embodiments of the present disclosure, upsampling and downsampling to a video frame will not bring an obvious boundary effect and may only result in the image being a little blurred; and since most pixel values of a difference video frame are very small, details lost due to upsampling and downsampling can be provided by adding the pixel values to the upsampled image without causing an obvious partition boundary effect, generating a high quality video. Moreover, based on the encoding and decoding methods according to the embodiments of the present disclosure, parallelism of encoding a high-resolution video is increased, and the speed of encoding is improved, hence, the methods are applicable to real-time application scenarios. In addition, multilevel low resolution downward compatibility can be achieved based on the embodiments of the present disclosure, which reduces storage and transmission bandwidth for applications such as Internet website that are required to provide bit streams for terminals having various resolutions and reduces a lot of repeated encoding and decoding calculation of low-resolution videos.

In addition, encoding information of a corresponding low-resolution video frame may be used in the process of encoding a difference video frame, to improve the speed of encoding the difference video frame. Only one channel, Y component, is encoded instead of encoding three component channels YUV, hence calculation amount and bit rate are reduced. The methods can be applied to the existing encoding and decoding device without additional modification to the syntax layer, hence the methods are applicable to various video image encoding standards.

Figure 5:
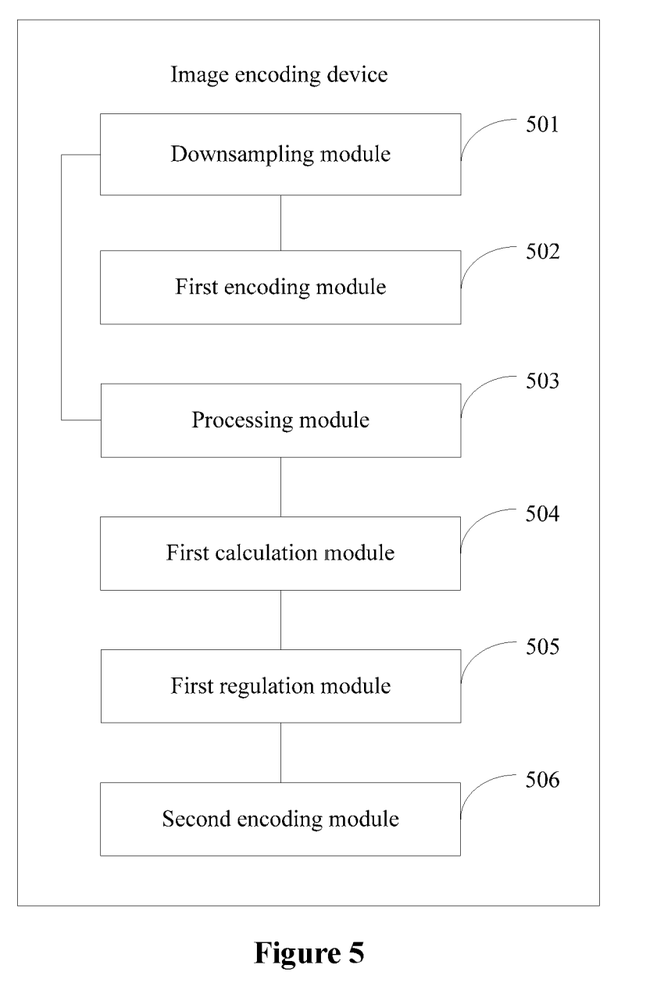
FIG. 5 is a schematic structural diagram of an image encoding device according to an embodiment of the present disclosure.

Corresponding to the above embodiments, an image encoding device is further provided according to an embodiment of the present disclosure. Reference is made to FIG. 5, which is a schematic structural diagram of the encoding device. The device includes: a downsampling module 501, a first encoding module 502, a processing module 503, a first calculation module 504, a first regulation module 505 and a second encoding module 506.

The downsampling module 501 is configured to perform downsampling on a first image based on a pre-set sampling ratio and a pre-set sampling method to obtain a second image, where the first image is a high-resolution image or a high-resolution video frame, or the first image is a low-resolution image or a low-resolution video frame obtained by performing downsampling on the high-resolution image or the high-resolution video frame for at least one time.

The first encoding module 502 is configured to encode the second image sampled by the downsampling module 501, to obtain a second image bit stream, and send the second image bit stream to a decoding end.

The processing module 503 is configured to process, based on a pre-set processing rule, the second image sampled by the downsampling module 501, to obtain a third image having a resolution the same as that of the first image.

The first calculation module 504 is configured to calculate a difference between the third image processed by the processing module 503 and the first image to obtain a first difference image.

The first regulation module 505 is configured to regulate, based on a pre-set offset value, pixel values of the first difference image calculated by the first calculation module 504, to fall within a pre-set range, so as to obtain a second difference image.

The second encoding module 506 is configured to encode the second difference image obtained by the first regulation module 505 from regulating, in a pre-set encoding manner, to obtain a second difference image bit stream, and send the second difference image bit stream to the decoding end to enable the decoding end to reconstruct the first image based on the second image bit stream and the second difference image bit stream.

Figure 6:
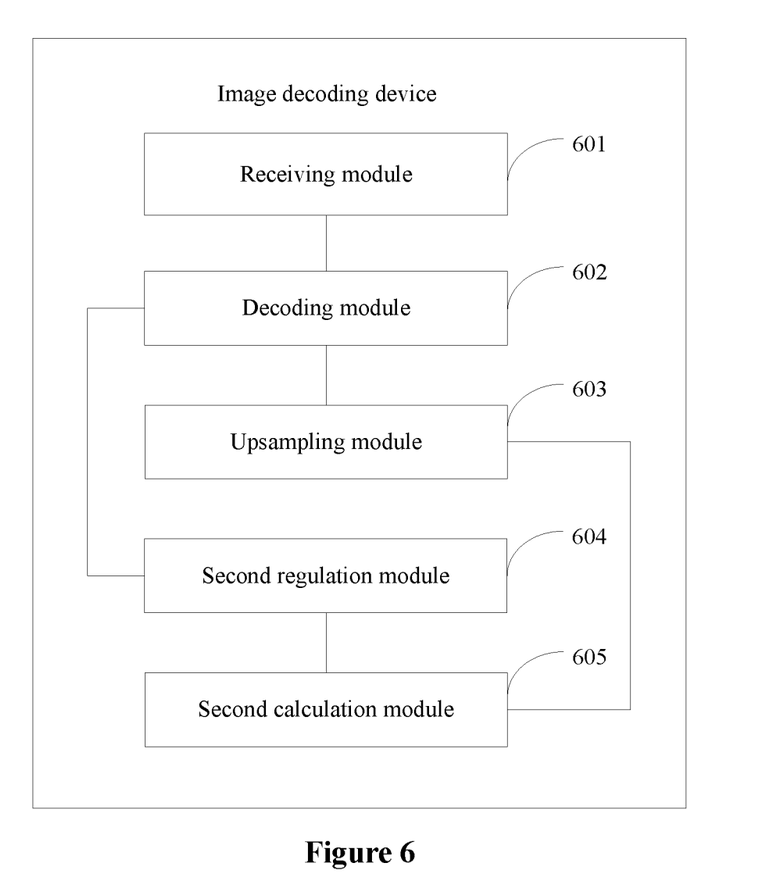
FIG. 6 is a schematic structural diagram of an image decoding device according to an embodiment of the present disclosure.

Reference is made to FIG. 6, which is a schematic structural diagram of an image decoding device corresponding to the image encoding device according to the above embodiment. The device may include: a receiving module 601, a decoding module 602, an upsampling module 603, a second regulation module 604 and a second calculation module 605.

The receiving module 601 is configured to receive a second image bit stream and a second difference image bit stream.

The decoding module 602 is configured to decode the second image bit stream and the second difference image bit stream received by the receiving module 601 to obtain a second image and a second difference image.

The upsampling module 603 is configured to perform upsampling on the second image obtained by the decoding module 602 from decoding, based on a pre-set sampling ratio and a pre-set sampling method to obtain a third image.

The second regulation module 604 is configured to regulate pixel values of the second difference image based on a pre-set offset value to obtain a first difference image.

The second calculation module 605 is configured to calculate a sum of the first difference image obtained by the second regulation module 604 from regulating and the third image to obtain a first image.

Based on the image encoding and decoding devices according to the embodiments of the present disclosure, upsampling and downsampling to an image will not bring an obvious boundary effect and may only result in the image being a little blurred; and since most pixel values of a difference image are very small, details lost due to upsampling and downsampling can be provided by adding the pixel values to the upsampled image without causing an obvious partition boundary effect, generating a high quality image/video. In addition, multilevel low resolution downward compatibility can be achieved based on the embodiments of the present disclosure, which reduces storage and transmission bandwidth for applications such as Internet website that are required to provide bit streams for terminals having various resolutions and reduces a lot of repeated encoding and decoding calculation of low-resolution images/videos.

The processing module in the image encoding device according to the above embodiment may be implemented in various manners. In a possible implementation, the processing module in the image encoding device according to the above embodiment includes a first upsampling submodule. The first upsampling submodule is configured to perform upsampling on the second image based on the pre-set sampling ratio and a pre-set sampling method to obtain the third image having the resolution the same as that of the first image.

In another possible implementation, the processing module may include a reconstruction submodule and a second upsampling module. The reconstruction submodule is configured to reconstruct the second image to obtain a second reconstruction image. The second upsampling submodule is configured to perform upsampling on the second reconstruction image reconstructed by the reconstruction submodule, based on the pre-set sampling ratio and a pre-set sampling method, to obtain the third image having the resolution the same as that of the first image.

The second encoding module in the image encoding module according to the above embodiments may be implemented in various manners. In a possible implementation, the second encoding module may include a first encoding submodule. The first encoding submodule is configured to perform full-image encoding on the second difference image to obtain one difference image bit stream.

In another possible implementation, the second encoding module may include a division submodule and a second encoding submodule. The division submodule is configured to divide the second difference image into multiple blocks to obtain multiple difference image blocks. The second encoding submodule is configured to encode the multiple difference image blocks divided by the division submodule, to obtain multiple difference image bit streams.

The image encoding device according to the above embodiments may further include a storage module. The storage module is configured to store an encoding parameter of second image when the first encoding module encodes the second image.

In a possible implementation the second encoding module is specifically configured to determine an encoding parameter of the second difference image based on the encoding parameter of the second image, and encode the second difference image based on the encoding parameter of the second difference image.

In the above embodiments, the second encoding module is specifically configured to: in a case that a value of at least one channel component of the second difference image is less than a set threshold, encode the other channel components.

In the image decoding device according to the above embodiment, the decoding module may include: a decoding submodule and a splicing submodule. The decoding submodule is configured to decode the second difference image bit stream in a case that the second difference image bit stream includes multiple difference image bit streams, to obtain multiple difference image blocks. The splicing submodule is configured to splice the multiple difference image blocks to obtain the second difference image.

In the above embodiments, the second image bit stream and the second difference image bit stream carry bit stream property information indicating whether a bit stream is a second image bit stream or a difference image bit stream, and index information of a block corresponding to the bit stream. In this case, the decoding module is specifically configured to decode the second image bit stream and the second difference image bit stream based on the bit stream property information and the index information of the block corresponding to the bit stream.

The various embodiments of the present disclosure are described in a progressive way, differences from other embodiments are emphatically illustrated in each of the embodiments, and reference can be made to each other for understanding the same or similar sections.

It should be understood that the disclosed methods and devices according to the embodiments of the present disclosure may be implemented in other ways. For example, the device embodiments described above are illustrative only. For example, the modules are divided merely in logical function, which may be divided by another way in actual implementation. For example, multiple modules or components may be combined or integrated into another system, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The modules described as separated components may or may not be physically separated. A module may or may not be a physical module, which may be located in one position or distributed on multiple network units. A part or all of the modules may be selected to achieve the object of solutions in the embodiments based on actual needs. In addition, the functional modules in the embodiments of the present disclosure may be integrated into a process unit or physically separated, or two or more modules may be integrated into a module.

If a described function is implemented in a form of a software functional unit and is sold or used as a separate product, it may be stored in a computer readable storage medium. With this in mind, part of the technical solutions of the present disclosure which contributes to the convention technology, or, part of the technical solutions may be implemented in a form of a software product, and the software product is stored in a storage medium and includes several instructions for enabling a computer device (which may be a personal computer, a server or a network device, etc.) to execute all or some of the steps in the methods according to the embodiments of the present disclosure. The storage medium includes: a medium capable of storing program codes, such as a USB flash disk, a mobile hard disk, a read-only memory (ROM), a random access memory (RAM), a magnetic disk or an optical disk.

The above descriptions of the disclosed embodiments enable those skilled in the art to implement or use the present disclosure. Various changes to the embodiments are apparent to those skilled in the art, and general principles defined herein may be implemented in other embodiments without departing from the spirit or scope of the present disclosure.

Therefore, the present disclosure is not limited to the embodiments disclosed herein but is to conform to the widest scope consistent with the principles and novel features disclosed herein.

The invention claimed is:

1. An image encoding method applied to an encoding end, comprising:
   performing multiple levels of downsampling on a first image based on a pre-set sampling ratio and a pre-set sampling method to obtain multiple levels of second images, wherein the first image is a high-resolution image or a high-resolution video frame, or the first image is a low-resolution image or a low-resolution video frame obtained by performing downsampling on the high-resolution image or the high-resolution video frame for at least one time; and
   performing following processing on each layer of the multiple levels of second images to achieve multilevel low resolution downward compatibility:
      encoding the second image to obtain a second image bit stream, and sending the second image bit stream to a decoding end;
      processing the second image based on a pre-set processing rule to obtain a third image having a resolution the same as that of the first image;
      calculating a difference between the third image and the first image to obtain a first difference image;
      regulating, based on a pre-set offset value, pixel values of the first difference image to fall within a pre-set range, to obtain a second difference image; and
      encoding the second difference image in a pre-set encoding manner to obtain a second difference image bit stream, and sending the second difference image bit stream to the decoding end to enable the decoding end to reconstruct the first image based on the second image bit stream and the second difference image bit stream, wherein the encoding the second difference image in a pre-set encoding manner comprises: in a case that a value of a channel component of the second difference image is less than a set threshold, encoding other channel component except the channel component having a value less than the set threshold,
   wherein the regulating, based on the pre-set offset value, pixel values of the first difference image to fall within the pre-set range, to obtain the second difference image comprises:
      limiting the pixel values of the first difference image to the interval of [−pre-set offset value, +pre-set offset value], and adding the pre-set offset value to pixel values obtained after limiting to obtain the second difference image, wherein the pre-set offset value is set as a value ranging from 16 to 64.

2. The image encoding method according to claim 1, wherein the processing the second image based on a pre-set processing rule to obtain a third image having a resolution the same as that of the first image comprises:
   performing upsampling on the second image based on the pre-set sampling ratio and a pre-set sampling method to obtain the third image having the resolution the same as that of the first image;
   or,
   reconstructing the second image to obtain a second reconstruction image; and
   performing upsampling on the second reconstruction image based on the pre-set sampling ratio and a pre-set sampling method to obtain the third image having the resolution the same as that of the first image.

3. The image encoding method according to claim 1, wherein the encoding the second difference image in a pre-set encoding manner to obtain a second difference image bit stream comprises:
   performing full-image encoding on the second difference image to obtain one difference image bit stream;
   or,
   dividing the second difference image into a plurality of blocks to obtain a plurality of difference image blocks; and encoding the plurality of difference image blocks respectively to obtain a plurality of difference image bit streams.

4. The image encoding method according to claim 1, further comprising:
   storing an encoding parameter of second image when encoding the second image; wherein
   the encoding the second difference image in a pre-set encoding manner comprises:
   determining an encoding parameter of the second difference image based on the encoding parameter of the second image, and encoding the second difference image based on the encoding parameter of the second difference image.

5. An image encoding device comprising:
   a downsampling module, a first encoding module, a processing module, a first calculation module, a first regulation module and a second encoding module,
   wherein the downsampling module is configured to perform multiple levels of downsampling on a first image based on a pre-set sampling ratio and a pre-set sampling method to obtain multiple levels of second images, and the first image is a high-resolution image or a high-resolution video frame, or the first image is a low-resolution image or a low-resolution video frame obtained by performing downsampling on the high-resolution image or the high-resolution video frame for at least one time;
   for each layer of the multiple levels of second images,
      the first encoding module is configured to encode the second image to obtain a second image bit stream, and send the second image bit stream to a decoding end;
      the processing module is configured to process the second image based on a pre-set processing rule to obtain a third image having a resolution the same as that of the first image;
      the first calculation module is configured to calculate a difference between the third image and the first image to obtain a first difference image;
      the first regulation module is configured to regulate, based on a pre-set offset value, pixel values of the first difference image to fall within a pre-set range, to obtain a second difference image; and
      the second encoding module is configured to encode the second difference image in a pre-set encoding manner to obtain a second difference image bit stream, and send the second difference image bit stream to the decoding end to enable the decoding end to reconstruct the first image based on the second image bit stream and the second difference image bit stream, wherein the second encoding module is configured to: in a case that a value of a channel component of the second difference image is less than a set threshold, encode other channel component except the channel component having a value less than the set threshold,
   wherein the first regulation module is further configured to limit the pixel values of the first difference image to the interval of [−pre-set offset value, +pre-set offset value], and add the pre-set offset value to pixel values obtained after limiting to obtain the second difference image, wherein the pre-set offset value is set as a value ranging from 16 to 64.

6. The image encoding device according to claim 5, wherein the processing module comprises a first upsampling submodule, or comprises a reconstruction submodule and a second upsampling submodule;

the first upsampling submodule is configured to perform upsampling on the second image based on the pre-set sampling ratio and a pre-set sampling method to obtain the third image having the resolution the same as that of the first image;

the reconstruction submodule is configured to reconstruct the second image to obtain a second reconstruction image; and the second upsampling submodule is configured to perform upsampling on the second reconstruction image based on the pre-set sampling ratio and a pre-set sampling method to obtain the third image having the resolution the same as that of the first image.

7. The image encoding device according to claim 5, wherein the second encoding module comprises a first encoding submodule, or comprises a division submodule and a second encoding submodule;

the first encoding submodule is configured to perform full-image encoding on the second difference image to obtain one difference image bit stream;

the division submodule is configured to divide the second difference image into a plurality of blocks to obtain a plurality of difference image blocks; and the second encoding submodule is configured to encode the plurality of difference image blocks respectively to obtain a plurality of difference image bit streams.

8. The image encoding device according to claim 5, further comprising: a storage module, wherein the storage module is configured to store an encoding parameter of second image when the first encoding module encodes the second image; and the second encoding module is configured to determine an encoding parameter of the second difference image based on the encoding parameter of the second image, and encode the second difference image based on the encoding parameter of the second difference image.

* * * * *